Oct. 3, 1933.    E. L. BOWLES    1,929,052

CAMERA

Filed Nov. 8, 1930

Inventor
Edward L. Bowles
By
Attorney

Patented Oct. 3, 1933

1,929,052

UNITED STATES PATENT OFFICE 1,929,052

CAMERA

Edward Lindley Bowles, Wellesley Farms, Mass.

Application November 8, 1930. Serial No. 494,342

12 Claims. (Cl. 95—86)

The present invention relates to cameras, and more particularly to moving-picture cameras, and the chief object of the invention is to provide a novel device for holding the camera firmly in position during the taking of pictures. Other objects will be explained hereinafter and will be particularly pointed out in the appended claims.

Figure 1:
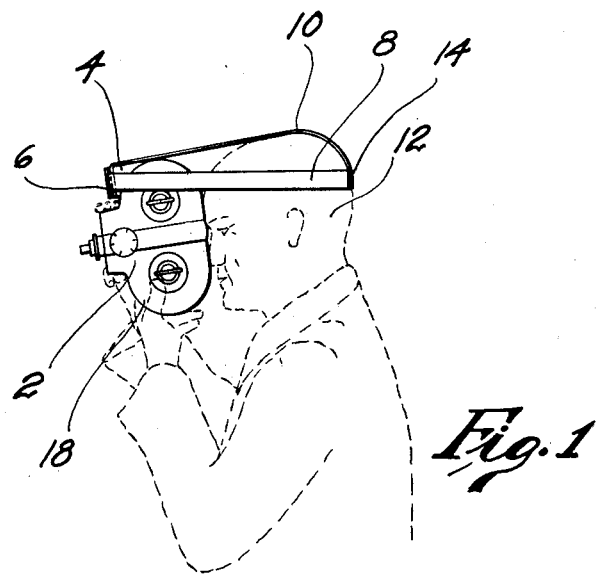
Figure 2:
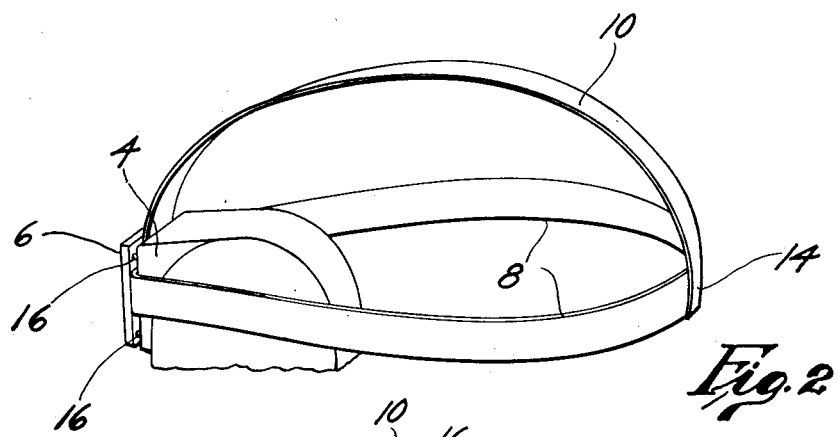
Figure 3:
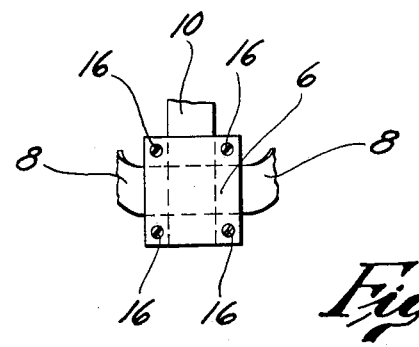

The invention will be more fully explained in connection with the accompanying drawing, in which Fig. 1 is a view illustrating the invention in actual use; Fig. 2 is a fragmentary view upon a larger scale, illustrating certain features of the invention; and Fig. 3 is a fragmentary view, looking from the left of Fig. 2.

The camera 2 is provided near its upper end with a block 4 against which is secured, by means of fastening members 6, a plurality of head bands 8 and 10, the former being designed to pass horizontally about the upper portion of the skull 12 of the operator, and the latter being adapted to engage the top of the skull. The head bands 8 and 10 may be secured together in any desired way at 14, the fastening member 6 similarly holding the head bands together against the block 4 in any approved manner, as by means of screws 16. The head bands may be rendered adjustable in any desired manner as by means of elastic webbing or buckles.

By the use of the present invention, it is possible to operate the camera 2 without danger that it will accidentally move during the taking of the pictures and without having to employ the inconvenience of a tripod. Owing to the fact that the fastening member is disposed at the upper end of the camera, a slight pressure with the hand at the lower end 18 toward the face of the operator will place sufficient tension upon the head bands 8 and 10 to assure that the camera shall not accidentally move during its operation. A very simple construction is thus provided that assures the camera being, in effect, an integral part of the operator himself. In this manner, the operator may move at will from place to place and in any direction without affecting the relatively stationary position of the camera with respect to himself. Being held so exceedingly steady, therefore, excellent pictures may be secured.

Obviously, the invention may be modified in many ways without departing from its spirit and scope. It is not essential, for example, that a block 4 or a fastening member 6 of the type illustrated, in the form of a plate, be used. Again, the head bands may be fixed not necessarily to a part 4 of the camera, but to some other part, such as a case. All such other modifications are considered to be within the spirit and scope of the invention as defined in the appended claims.

What is claimed is:

1. A camera provided with a head band for holding the camera fixed against the front of the head, and means for supporting the camera on the front portion of the head band.

2. A camera provided with a front block, a head band for holding the camera fixed against the front of the head, and a fastening member for securing the head band to the block.

3. A camera provided with a block near its upper end, a head band adapted to pass horizontally about the upper portion of the skull, a second head band adapted to engage the top of the skull and secured to the first-named head band, and a fastening member for securing the head bands to the block.

4. A camera provided with a head band for holding the camera fixed against the front of the head, and means for adjusting the head band to a length equal to the length between the front of the camera and the back of the head when the camera is disposed against the front of the head.

5. A camera provided with a head band adapted to pass horizontally about the upper portion of the skull, a second head band adapted to engage the top of the skull and secured to the first-named head band, and means for securing the camera to the head bands.

6. A camera provided with a front block near its upper end, a head band for holding the camera fixed against the front of the head, and a fastening member for securing the head band to the block.

7. A camera provided with a head band for holding the camera fixed against the head, and means for securing the head band to the upper portion of the camera.

8. In combination, a camera, a head band attached directly to the camera, and means for adjusting the head band to hold the camera fixed against the front of the head.

9. A camera provided with a fastening means near its upper end, a head band for holding the camera fixed against the front of the head, and means for securing the head band to the fastening means.

10. A camera provided with a head band, and means for securing the head band to the upper portion of the camera, the head band being constituted of material such that a slight pressure at the lower end of the camera toward the head when the head band is mounted on the head will tension the head band to hold the camera firmly in position against the front of the head.

11. A camera provided with a head band adapted to pass horizontally about the upper portion of the skull, and means for securing the camera directly to the head band.

12. A camera provided with a head band for holding the camera fixed against the front of the head, means for securing the head band directly to the camera, and means for adjusting the head band to a length equal to the length between the camera and the back of the head when the camera is disposed against the front of the head.

EDWARD LINDLEY BOWLES.